US006542092B1

United States Patent
Pan

(10) Patent No.: US 6,542,092 B1
(45) Date of Patent: Apr. 1, 2003

(54) KEYBOARD WITH MULTIPLE INPUT/OUTPUT FUNCTION

(75) Inventor: Jung-Chuan Pan, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/519,569

(22) Filed: Mar. 6, 2000

(51) Int. Cl.$^7$ .......................................... H03K 17/735
(52) U.S. Cl. ........................ 341/26; 455/557; 455/556
(58) Field of Search .......................... 341/26; 455/557, 455/556, 573, 572

(56) References Cited

U.S. PATENT DOCUMENTS

| | | | | |
|---|---|---|---|---|
| 5,220,601 A | * | 6/1993 | Gulick et al. | 341/22 |
| 5,512,893 A | * | 4/1996 | Gulick | 341/22 |
| 5,625,673 A | * | 4/1997 | Grewe et al. | 379/428.03 |
| 5,884,190 A | * | 3/1999 | Lintula et al. | 455/552 |
| 5,907,815 A | * | 5/1999 | Grimm et al. | 455/557 |
| 5,926,170 A | * | 7/1999 | Oba | 341/20 |
| 6,128,372 A | * | 10/2000 | Tsai et al. | 379/110.01 |
| 6,266,539 B1 | * | 7/2001 | Pardo | 379/93.05 |
| 6,366,784 B1 | * | 4/2002 | Hsueh | 379/428.02 |

* cited by examiner

Primary Examiner—Michael Horabik
Assistant Examiner—Hung Dang
(74) Attorney, Agent, or Firm—Rosenberg, Klein & Lee

(57) ABSTRACT

A computer keyboard has multiple input/output function and is connected to a computer (or a set-top box). The keyboard comprises a keyboard main body, and a handset slot. The keyboard main body has a control circuit, a scan matrix circuit connected to the control circuit; a first switch and a second switch. The control circuit is connected to the normally-close terminals of the first switch and the second switch. The communication interface (such as USB or RS-232) of the keyboard is connected to the normally-open terminals of the first switch and the second switch. The common terminal of the first switch is connected to the handset slot and the internal circuit of the handset. The common terminal of the second switch is connected to the internal circuit of the computer. The keyboard main body has function key set connected to the control circuit when being pressed. The function key set controls the first switch and the second switch to switch between the normally-open and normally-close state, whereby the keyboard can be used as input means of the handset and the handset can exchange data with the computer through the communication interface.

4 Claims, 4 Drawing Sheets

KEYBOARD WITH MULTIPLE INPUT/ OUTPUT FUNCTION

FIELD OF THE INVENTION

The present invention relates to a keyboard, especially to a keyboard with multiple input/output function for both a computer and a mobile handset.

BACKGROUND OF THE INVENTION

There is a trend to access the Internet by using a set-top-box equipped with a wireless keyboard; meanwhile there is also a trend to communicate with other individuals, such as family members, by using a mobile handset. Accordingly, it is desirable to design a keyboard with I/O function for both the set-top-box (or any connected computer) and the mobile handset.

It is an object of the invention to provide a keyboard integrated with I/O function for a mobile handset, wherein the keyboard is provided with a control circuit, a switch module and a communication interface to exchange data between the mobile handset and the set-top-box (or any connected computer), the module handset and the keyboard, and the set-top-box and the keyboard.

The various objects and advantages of the present invention will be more readily understood from the following detailed description when read in conjunction with the appended drawing, in which:

DETAILED DESCRIPTION OF THE PREFERRED EMBODIMENT

Figure 1:
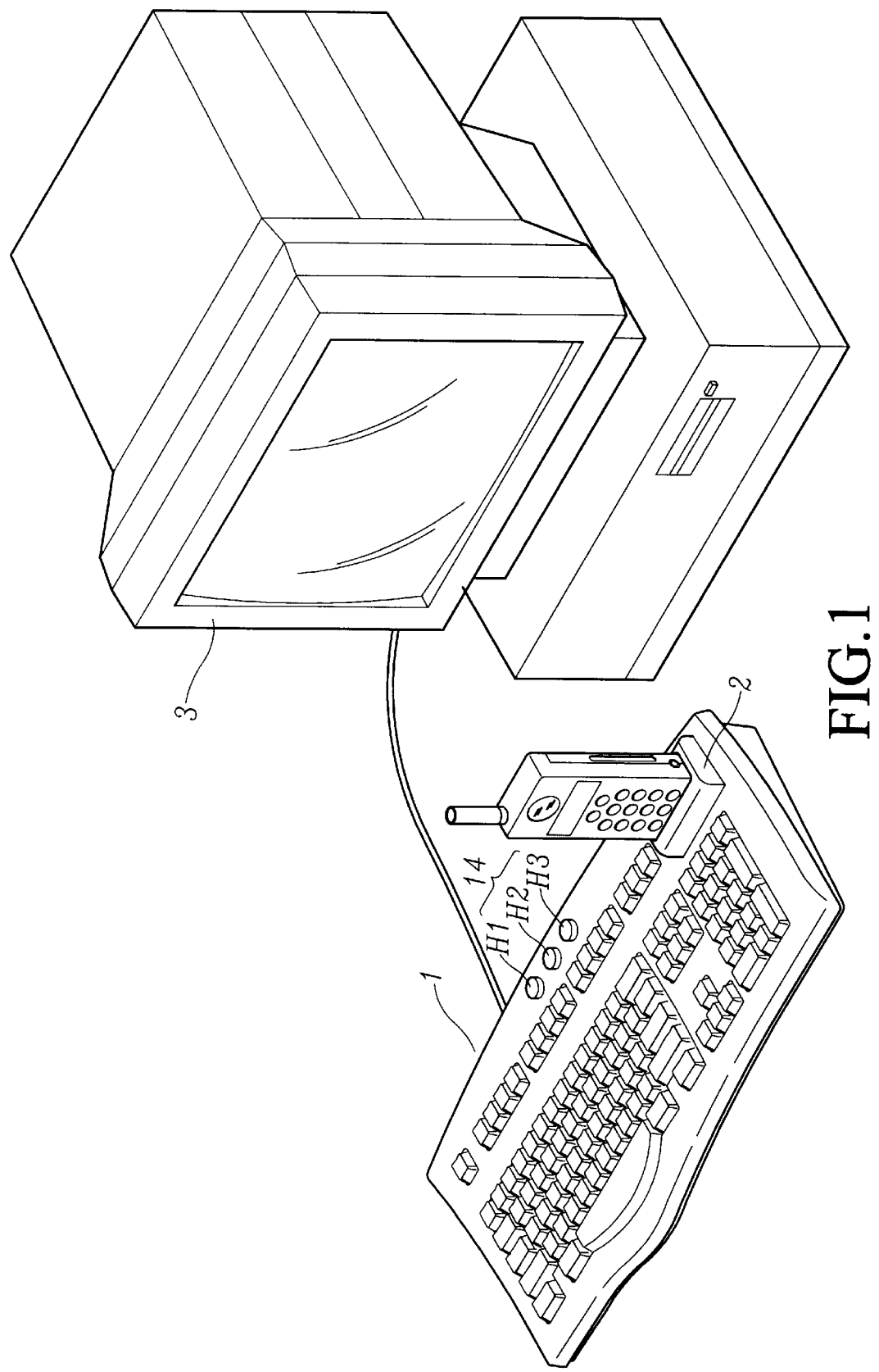
FIG. 1 is a perspective view of a keyboard according to the present invention.
Figure 2:
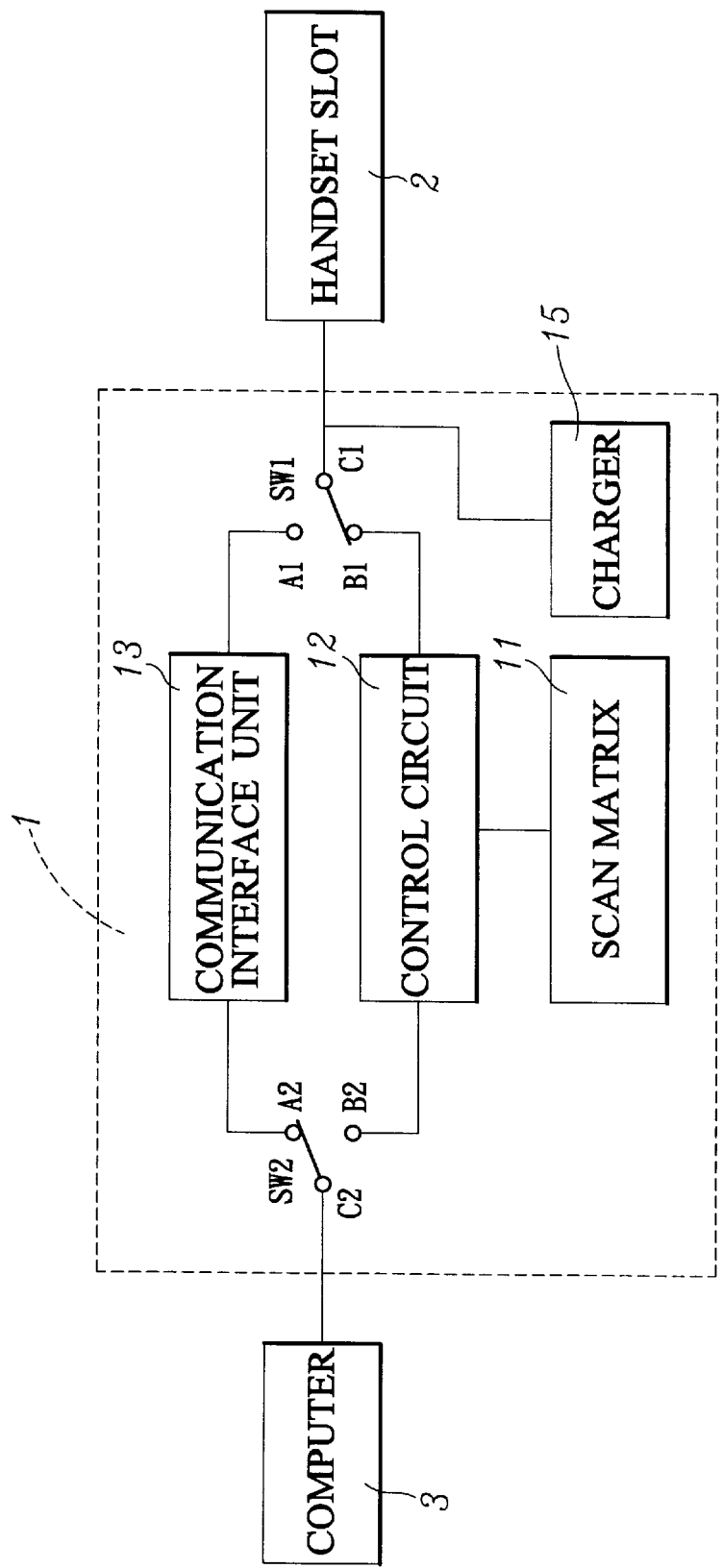
FIG. 2 is a block diagram of a keyboard according to the present invention when exchanging data between the computer and the mobile handset.

As shown in FIGS. 1 and 2, the keyboard device with multiple input/output function according to a preferred embodiment of the present invention is disclosed. The keyboard device is wire or wirelessly connected to a computer 3, which includes a keyboard main body 1 and a handset slot 2 installed thereon. Alternatively the computer 3 can be a processor of a set-top box when the keyboard is a wireless one for user to access the Internet through TV.

The keyboard main body 1 comprises a control circuit 12 therein. The input of the control circuit 12 is connected to a scan matrix 11, and the control circuit 12 is connected to normally-close terminals B1 nd B2 of the first switch SW1 and the second switch SW2, respectively. The normally-open terminals A1 and A2 of the first switch SW1 and the second switch SW2 are connected to a communication interface unit 13 (such as USB, or RS-232). The handset slot 2 is arranged at top right side of the keyboard main body 1 to accommodate handset of various brands and sizes and has electric connection with the handset inserted therein. The handset is powered by an external power source or by the computer 3. Moreover, a charger 15 is provided within the keyboard body for charging the mobile handset during usage. A function key set 14 is arranged at top center of the keyboard main body 1. In the preferred embodiment, the function key set 14 has three functional keys H1–H3. The functional keys H1–H3 are connected to the control circuit 12 upon pressing, and are used to keep the first switch SW1 and the second switch SW2 at normally-open or normally-close terminals.

The handset slot 2 is connected to the common terminal C1 of the first switch SW1. The first switch SW1 provides connection between the internal circuit of the handset and the control circuit 12 when the common terminal C1 is contacted the normally-close terminal B1. The first switch SW1 provides connection between the internal circuit of the handset and the communication interface unit 13 when the common terminal C1 is contacted the normally-open terminal A1.

The internal circuit of the computer 3 is connected to the common terminal C2 of the second switch SW2. The second switch SW2 provides connection between the internal circuit of the computer 3 and the control circuit 12 when the common terminal C1 is contacted the normally-close terminal B2. The second switch SW2 provides connection between the internal circuit of the computer 3 and the communication interface unit 13 when the common terminal C1 is contacted the normally-open terminal A2.

When the first function key Hi is pressed, the contact of the first switch SW1 is switched to the normally-close state, the second switch SW2 is switched to the normally-open state. In other word, the common terminal C1 of the first switch SW1 is contacted the normally-close terminal B1 (the common terminal C1 of the first switch SW1 is not contacted the normally-open terminal A1); and the common terminal C2 of the second switch SW2 is contacted the normally-open terminal A2 (the common terminal C2 of the second switch SW2 is not contacted the normally-close terminal B2). At this time, the first switch SW1 provides connection between the internal circuit of the handset and the control circuit 12. The keyboard can be used as input means of the handset through the handset slot 2.

Figure 3:
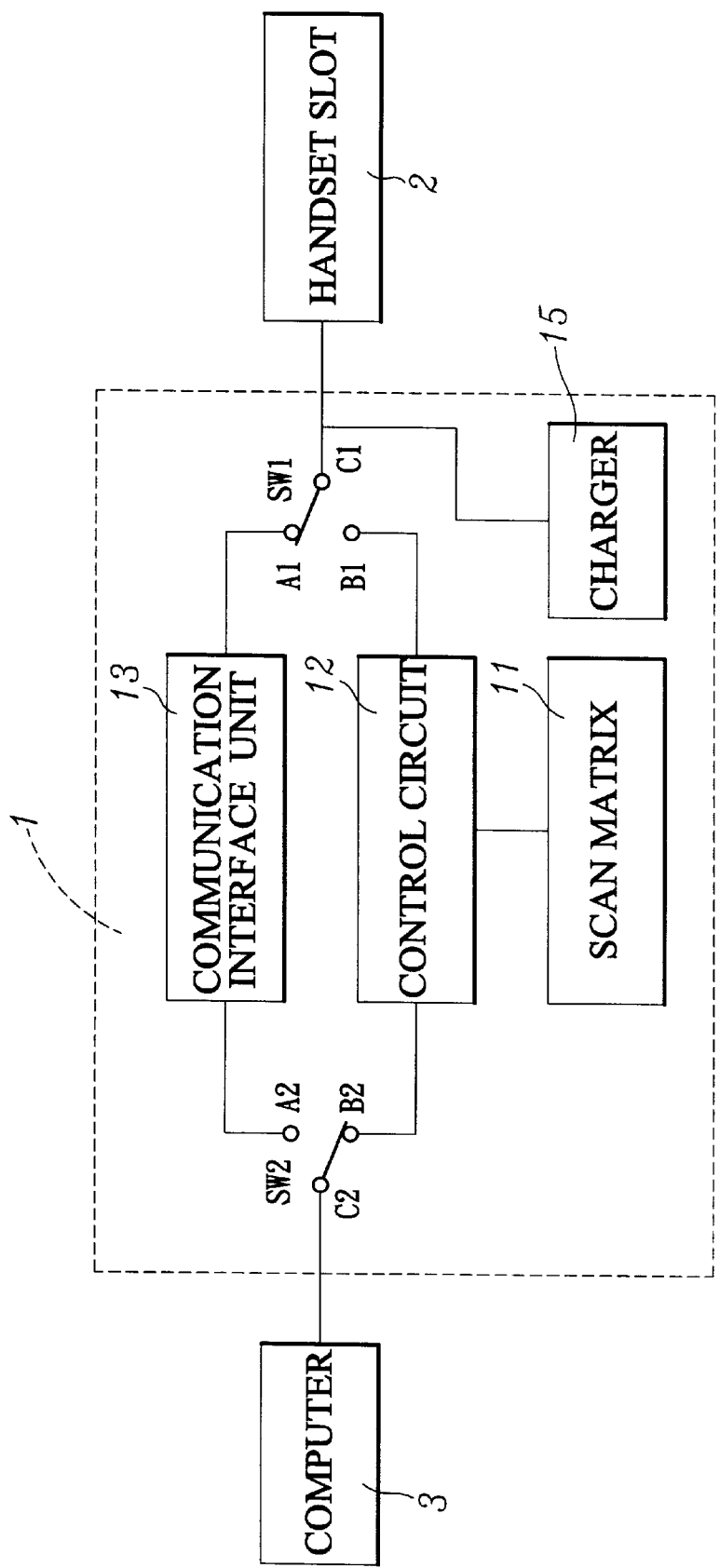
FIG. 3 is a block diagram of a keyboard according to the present invention when exchanging data between the computer and the keyboard.

With reference now to FIGS. 1 and 3, another preferred embodiment is demonstrated. When the second function key H2 is pressed, the contact of the first switch SW1 is switched to the normally-open state, the second switch SW2 is switched to the normally-close state. In other word, the common terminal C1 of the first switch SW1 is contacted the normally-open terminal A1 (the common terminal C1 of the first switch SW1 is not contacted the normally-close terminal B1); and the common terminal C2 of the second switch SW2 is contacted the normally-close terminal B2 (the common terminal C2 of the second switch SW2 is not contacted the normally-open terminal A2). At this time, the second switch SW2 provides connection between the internal circuit of the computer and the control circuit 12. The keyboard can be used as input means of the computer.

Figure 4:
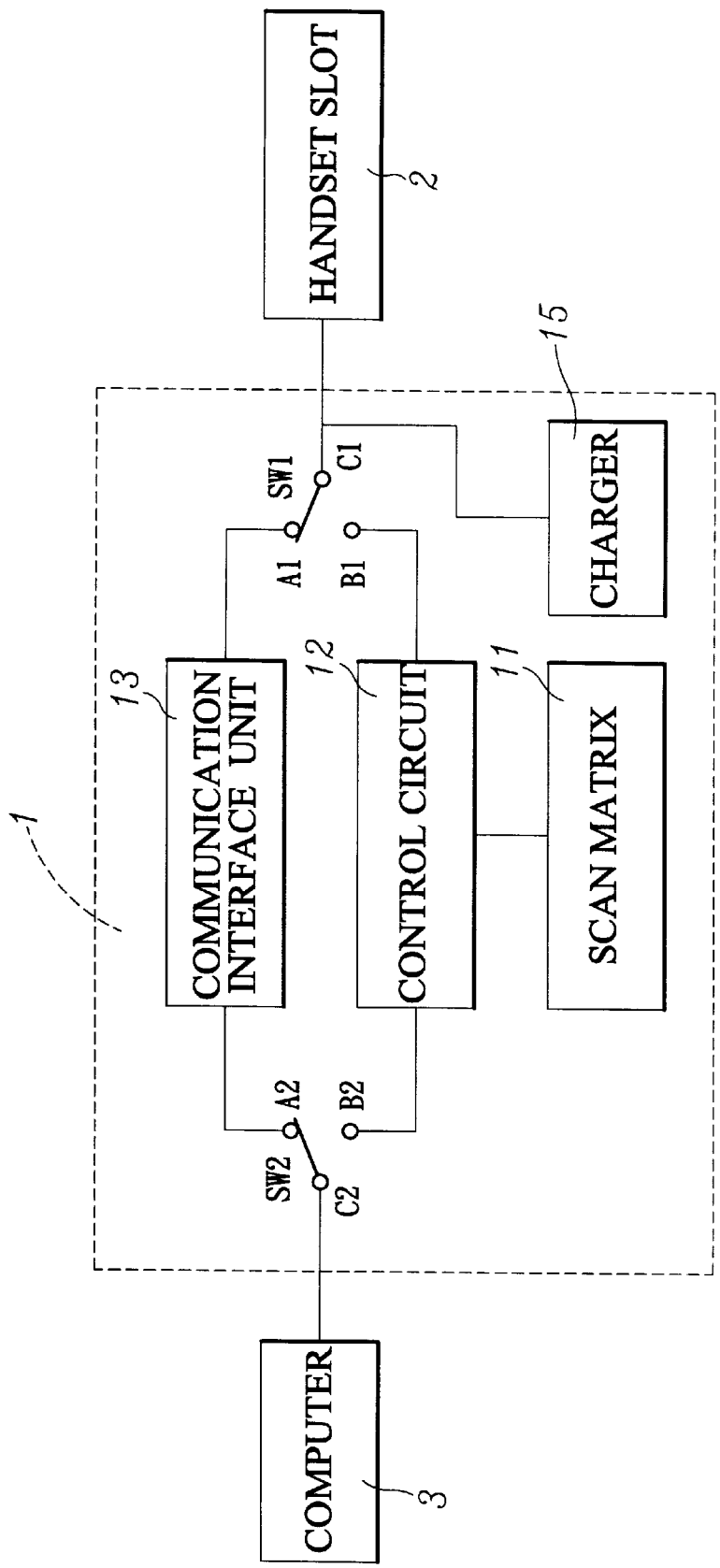
FIG. 4 is a block diagram of a keyboard according to the present invention when exchanging data between the computer and the mobile handset.

With reference now to FIGS. 1 and 4, another preferred embodiment is demonstrated. When the third function key H3 is pressed, the contact of the first switch SW1 is switched to the normally-open state, the second switch SW2 is switched to the normally-open state. In other word, the common terminal C1 of the first switch SW1 is contacted the normally-open terminal A1 (the common terminal C1 of the first switch SW1 is not contacted the normally-close terminal B1); and the common terminal C2 of the second switch SW2 is contacted the normally-open terminal A2 (the common terminal C2 of the second switch SW2 is not contacted the normally-close terminal B2). At this time, the internal circuit of the handset is connected to the internal circuit of the computer 3 through the communication interface unit 13. Therefore, the handset can exchange data with the computer 3.

To sum up, the computer keyboard with multiple input/output units according to the present invention integrates the wireless communication function of mobile phone on the computer keyboard. The handset can exchange data conveniently with the computer through the communication interface unit (USB or RS-232) of the computer. The keyboard can be used as input means of the handset, thus providing more flexibility and convenience to user.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim

1. A keyboard having an interface for communicating with both a computer and a mobile phone, comprising:

a keyboard body having a plurality of key switches, a first portion of said plurality of key switches being function key switches;

a control circuit disposed in said keyboard body and being coupled to said plurality of key switches;

a handset slot formed in said keyboard body for coupling the mobile phone thereto;

a communication interface unit disposed in said keyboard body;

a first switch coupled to said handset slot, said control circuit and said communication interface unit, said first switch selectively coupling said handset slot to one of said control circuit and said communication interface unit; and, a second switch coupled to the computer, said control circuit and said communication interface unit, said second switch selectively coupling the computer to one of said control circuit and said communication interface unit, said first and second switches being controlled to (a) couple at least a second portion of said plurality of key switches to the mobile phone in said handset slot through said control circuit for entering data to the mobile phone therewith, (b) couple at least said second portion of said plurality of key switches to the computer through said control circuit for entering data to the computer therewith, and (c) couple the computer to the handset slot through said communication interface unit for transferring data between the mobile phone in said handset slot and the computer.

2. The keyboard as recited in claim 1, wherein a first of said function key switches is operable to couple at least said second portion of said plurality of key switches to the mobile phone in said handset slot through said control circuit.

3. The keyboard as recited in claim 2, wherein a second of said function key switches is operable to couple at least said second portion of said plurality of key switches to the computer through said control circuit.

4. The keyboard as recited in claim 3, wherein a second of said function key switches is operable to couple the computer to the handset slot through said communication interface unit.

* * * * *